US012791228B2

(12) United States Patent
Hou et al.

(10) Patent No.: US 12,791,228 B2
(45) Date of Patent: Nov. 10, 2026

(54) STATIC MIXER AS HEAT EXCHANGE ENHANCER FOR ENHANCED AND ADVANCED GEOTHERMAL APPLICATION

(71) Applicant: Schlumberger Technology Corporation, Sugar Land, TX (US)

(72) Inventors: Chang-Yu Hou, Cambridge, MA (US); William J. Bailey, Cambridge, MA (US); Jean Elkhoury, Cambridge, MA (US)

(73) Assignee: Schlumberger Technology Corporation

( * ) Notice: Subject to any disclaimer, the term of this patent is extended or adjusted under 35 U.S.C. 154(b) by 0 days.

(21) Appl. No.: 19/030,164

(22) Filed: Jan. 17, 2025

(65) Prior Publication Data

US 2026/0210584 A1 Jul. 23, 2026

(51) Int. Cl.

| | |
|---|---|
| ***F24T 10/20*** | (2018.01) |
| ***F03G 4/00*** | (2006.01) |
| ***F24T 10/00*** | (2018.01) |
| ***F24T 50/00*** | (2018.01) |

(52) U.S. Cl.

CPC ................ *F24T 10/20* (2018.05); *F03G 4/00* (2021.08); *F24T 50/00* (2018.05); *F24T 2010/50* (2018.05)

(58) Field of Classification Search

CPC ....... F24T 10/20; F24T 50/00; F24T 2010/50; F03G 4/00

USPC .............................................. 60/641.2-641.4

See application file for complete search history.

(56) References Cited

U.S. PATENT DOCUMENTS

| | | | | | |
|---|---|---|---|---|---|
| 3,607,735 | A * | 9/1971 | Hover | B01D 21/0018 | 210/627 |
| 4,451,442 | A * | 5/1984 | Jeffrey | B01D 53/1462 | 60/641.2 |
| 5,240,687 | A * | 8/1993 | Gallup | F24T 10/20 | 75/712 |
| 2014/0311737 | A1* | 10/2014 | Bedouet | E21B 49/10 | 166/264 |
| 2019/0233697 | A1* | 8/2019 | Novek | F25B 37/00 | |
| 2023/0059338 | A1* | 2/2023 | Miller | F24T 10/20 | |
| 2023/0114197 | A1* | 4/2023 | Hughes | F24T 10/10 | 165/45 |

* cited by examiner

*Primary Examiner* — Hoang M Nguyen

(57) ABSTRACT

Embodiments presented provide for an arrangement and method of using a static mixer in heat exchanging wellbores. In embodiments, a high-efficiency geothermal system is created that allows a static mixer to be used in conjunction with a power production system that creates an efficient power production cycle with reduced maintenance and efficiency greater than conventional systems.

21 Claims, 4 Drawing Sheets

STATIC MIXER AS HEAT EXCHANGE ENHANCER FOR ENHANCED AND ADVANCED GEOTHERMAL APPLICATION

CROSS-REFERENCE TO RELATED APPLICATIONS

None.

FIELD OF THE DISCLOSURE

Aspects of the disclosure relate to heat exchanging technology. More specifically, aspects of the disclosure relate to using a static mixer for heat exchanging enhancement in geothermal applications.

BACKGROUND

In a world increasingly focused on sustainability, utilizing alternative forms of energy is immensely beneficial for society. One such resource is geothermal energy, which is abundant in certain regions and can significantly reduce the reliance on carbon-based energy systems. The utilization of geothermal energy not only provides a cleaner energy source but also harnesses the Earth's natural heat in an efficient and sustainable manner. With such benefits, geothermal energy provides an attractive energy source that has not been fully developed.

Geothermal energy extraction typically involves the creation of a borehole into a geological stratum. This initial step is crucial as it establishes a pathway to access the Earth's heat. Once the borehole is created, a highly conductive material may be introduced into the wellbore. This material plays a pivotal role in enhancing heat transfer from the geological stratum to the running fluid within the wellbore. The running fluid, which flows through the wellbore, absorbs the heat from the stratum and can then be utilized for various applications, including electricity generation and direct heating. In some areas of the globe, such applications are particularly attractive as electrical generating stations may be remote and carbon-based fuel sources may be too expensive to use or transport.

Conventional heat extraction methods are notoriously costly to establish. The drilling process alone requires significant financial investment, and the materials used must withstand extreme temperatures and pressures. Additionally, geological features do not always accommodate the establishment of conventional systems. Variability in geological formations can pose challenges that require specialized techniques and equipment, further driving up costs.

Another major drawback of conventional systems is their lack of adaptability to changing geological strata. As the underground environment shifts and natural conditions evolve, the fixed nature of traditional geothermal wells can become a liability. These systems are often designed and constructed to operate within specific parameters, making it difficult to adapt to unforeseen changes without significant modifications or complete overhauls of the infrastructure. When adaptation is required, specialty equipment must be used, further driving up costs. As a result, conventional geothermal power production techniques are often limited.

Maintenance of conventional geothermal wells also presents considerable challenges. The harsh conditions within the wellbore, including high temperatures and pressures, can lead to rapid wear and tear of equipment and materials. Regular maintenance is essential to ensure the continued efficiency and safety of the geothermal system, but it can be highly manpower-intensive and costly. This ongoing need for maintenance can deter investment in geothermal projects despite their long-term benefits. Given these challenges, there is a pressing need for innovation in geothermal energy extraction methods. Advances in technology and engineering can help overcome the limitations of conventional systems. For instance, the development of more flexible and adaptable materials, as well as improved drilling and maintenance techniques, could reduce costs and increase the feasibility of geothermal energy projects. Enhancing the efficiency of heat transfer and minimizing the impact of geological variability are key areas of focus for researchers and engineers working in this field. Unfortunately, conventional systems rely on unique designs, thereby driving up the overall complexity, cost and maintenance of such systems.

While geothermal energy presents a valuable alternative to carbon-based energy systems, the conventional methods of extraction come with significant financial and operational challenges. Addressing these challenges through technological innovation and improved methodologies is crucial for the future of geothermal energy.

There is a need to provide an apparatus and methods that easier to operate compared to conventional apparatus and methods.

There is a further need to provide apparatus and methods that do not have the drawbacks discussed above, namely high initial capital costs for system creation and high maintenance costs.

There is a still further need to reduce economic costs associated with operations and apparatus described above with conventional tools.

There is a further need to create a system that is adaptable for different wellbore environments and that has a high variety of uses in various environments.

There is a further need to create a system that does not use or minimizes use of specialty designs therefore providing a more standardized system for geothermal extraction.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, a method for conducting a heat transfer to a fluid in a geothermal application by a system is disclosed. The method may comprise establishing a wellbore with at least one of a vertical and a horizontal section. The method may further comprise pumping a fluid into a geological stratum, the fluid at a first temperature and first pressure. The method may further comprise creating a turbulent flow in the pumped fluid using a static fluid mixer placed within the wellbore. The method may further comprise transferring heat from the geological stratum to the turbulent flow within the wellbore. The method may further comprise recovering the turbulent flow and returning the turbulent flow at a second temperature and a second pressure. The method may further comprise utilizing the transferred heat in the turbulent flow in an industrial process.

In another example embodiment, a method for conducting a heat transfer to a fluid in a geothermal application by a system is disclosed. The method may comprise accessing a wellbore with at least one of a vertical and a horizontal section, the wellbore located within a geothermal area. The method may further comprise pumping a fluid into a geological stratum of the geothermal area, the fluid at a first temperature and first pressure. The method may further comprise passing the fluid through a static mixer placed within the wellbore. The method may further comprise transferring heat from the geological stratum to the fluid within the wellbore. The method may further comprise recovering the fluid at a second temperature and a second pressure, wherein the second temperature is higher than the first temperature. The method may further comprise utilizing the fluid at the second temperature and the second pressure in an industrial process.

In another example embodiment, a method for extracting heat from a geothermal source by a system is disclosed. The method may comprise one of creating and accessing a wellbore placed within the geothermal source. The method may further comprise transmitting a fluid into a geological stratum of the geothermal source, the fluid at a first temperature and first pressure. The method may further comprise passing the fluid through a static mixer placed within the wellbore. The method may further comprise transferring heat from the geothermal source to the fluid within the wellbore. The method may further comprise recovering the fluid at a second temperature and a second pressure, wherein the second temperature is higher than the first temperature.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted; however, that the appended drawings illustrate only typical embodiments of this disclosure and are; therefore, not be considered limiting of its scope, for the disclosure may admit to other equally effective embodiments.

Figure 1:
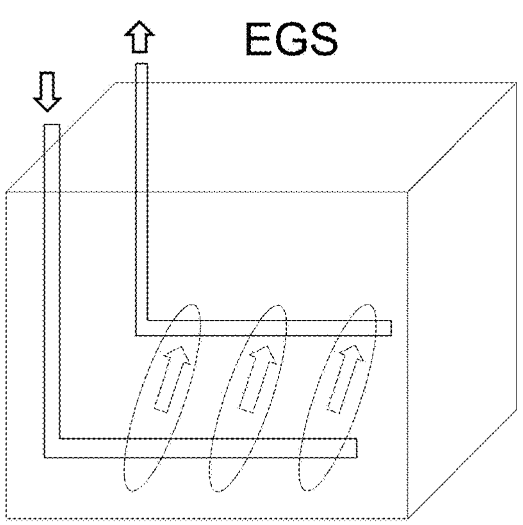
FIG. 1 is a series of schematic plots that show an embodiment of an enhanced geothermal system (EGS—left) and an advanced geothermal system (AGS—right).

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood; however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer, or section. Terms such as "first", "second", and other numerical terms, when used herein, do not imply a sequence or order unless clearly indicated by the context. Thus, a first element, component, region, layer, or section discussed herein could be termed a second element, component, region, layer, or section without departing from the teachings of the example embodiments.

When an element or layer is referred to as being "on", "engaged to", "connected to", or "coupled to" another element or layer, it may be directly on, engaged, connected, coupled to the other element or layer, or interleaving elements or layers may be present. In contrast, when an element is referred to as being "directly on", "directly engaged to", "directly connected to", or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood; however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Unlike conventional hydro-geothermal systems, where high temperature water/brine is produced from the underground reservoirs for power production, unconventional geothermal systems, such as enhanced and advanced geothermal systems (EGS and AGS, respectively), aim to extract energy from dry geothermal heat sources. In such scenarios, working fluids, such as water, and other fluids, are injected into the subsurface from an injection well for heat exchange before being produced at a higher temperature from a production well. In some embodiments, the fluid may be in its supercritical phase, such as supercritical carbon dioxide. As a result, efficient heat exchange between injected fluid and formation is critical for the success of such unconventional geothermal projects. One conventional approach, in EGS, to boost the heat exchange is to increase the surface area of the actual heat exchange by creating flowing fractures for improved heat exchange. In other instances, the so-called AGS, (including those in the shallow crust at the scale of a few hundred meters depth and referred to as geo-energy), uses a fully or partially closed-loop system with working fluids staying inside the borehole. AGS systems rely heavily on the heat exchange between the formation and the working fluid in the wellbore. Such systems may be at a scale of a few hundred to a few thousand meters depth.

Aspects of the disclosure enhance the heat exchange rate in the wellbore as part for both enhanced or advanced geothermal systems by utilizing static mixers inserted either in the vertical or/and the horizontal sections of the injection borehole. The exact amount of heat exchange enhancement generally depends on the flow rate and the nature of the working fluid(s). As an example, for a typical flow rate with water as the working fluid, the heat exchange efficiency can be enhanced between 5 and 10 percent. In other embodiments, efficiencies may vary higher and/or lower.

Referring to FIG. 1, representative construction arrangements for embodiments of EGS and AGS are shown. Both systems have the goal of extracting energy from dry heat sources that are traditionally not amicable for energy generation. A difference between EGS and AGS systems is where and how the process of heat exchange occurs. For EGS, the heat exchange between the working fluid and the formation happens in induced fractures connecting the production and injection boreholes (FIG. 1 left side). For AGS, the heat exchange occurs primarily in the borehole (FIG. 1 right side). As a result, AGS configurations often require a much longer well, for longer fluid to rock contact duration, to achieve the requisite temperature. This longer well may typically be horizontal in orientation. Irrespective of the specific design, the efficiency and longevity for heat extraction are important in the success of these systems.

In one embodiment, by introducing a static mixer in the centerline of the borehole, a primary goal is achieved, namely, enhancement of the rate of the heat exchange between the working fluid and the formation in the wellbore. Conceptually, the fluid flow velocity near the pipe wall for regular pipe flow slows, or even approaches stagnation, depending on the in-situ flow regime (laminar or turbulent) controlled by operational conditions. Such wall stagnation of the fluid flow near the pipe/borehole wall reduces the rate of heat exchange between the fluid and the surrounding environment outside the pipe (i.e. formation). The introduction of the static mixer disturbs such regular fluid flow pattern by creating vortices and eddies which increase the heat exchange between the fluid at the center of casing/pipe and near the casing/pipe wall. This may be thought of as a means to “strip away” any stagnant (or slow-moving) liquid films that may be present in the region of interest. The term “film stripping” is defined to describe this phenomenon. In turn, the lower temperature fluid at the center of the well is accelerated toward the casing/pipe wall thus increasing heat extraction from the formation. The flow rate in EGS and AGS systems can be very different compared to that for surface pipe flow. In addition, the introduction of the mixer potentially increases the pressure drop across the casing/pipe, which is an important consideration for the design and selection of mixers. Below, examples of such devices are disclosed. In some embodiments, design configurations are favored that minimize pressure losses while maintaining higher heat exchange between the fluid and the formation.

Figure 2:
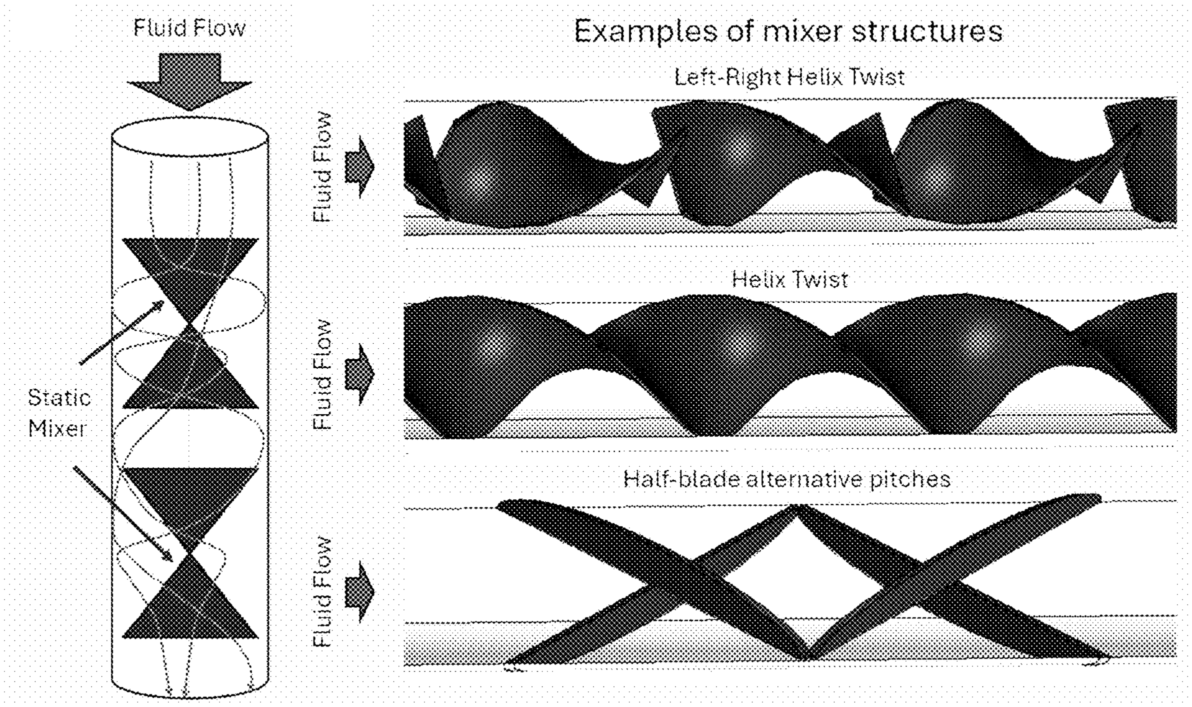
FIG. 2 is a schematic plot that shows a disturbed flow for enhancing heat exchange with three alternative static mixer designs.

A schematic plot in FIG. 2 (left side), shows the concept of static mixers as a vortex-inducer to enhance heat exchange. This is defined as “wall film shedding”. In this embodiment, the intent is to disturb the in-situ pipe flow pattern and enhance contact time of colder fluids with downhole surfaces that have heat while removing any stagnant/slow-moving fluids at the well wall. The specific design of mixers can vary, depending on applications, desired flow regime, and other parameters, which may be designed and optimized for. Referring to FIG. 2 (right side), example mixer designs are shown. It should be noted that this is not all of the possible configurations. Other static heat exchange mixer designs are also possible, and potentially more efficient. The static heat exchange mixer can be installed at select locations/sections of the horizontal well or select vertical sections of the injection well for both EGS and AGS, depending on the operational conditions, the geothermal gradient, and the heat resource optimization.

By installing the static mixer in the vertical section of the injection well, this configuration improves heat exchange between the working fluid and the surrounding formation. This can help to extract energy from the lower temperature sections, compared to the temperature of the targeted heat reservoirs. As a result, the static mixer can be installed at depths where the formation temperature is expected to be higher than that of the injected fluids. The static mixer can also be installed in the horizontal section of the borehole, embedded inside the target reservoir, for both EGS and AGS, to increase the temperature of the produced working fluids. Overall, the mixer can increase the utilization of heat bodies surrounding the borehole and along its length helping the reservoir management for extending the useful life of the heat reservoir.

Figure 3:
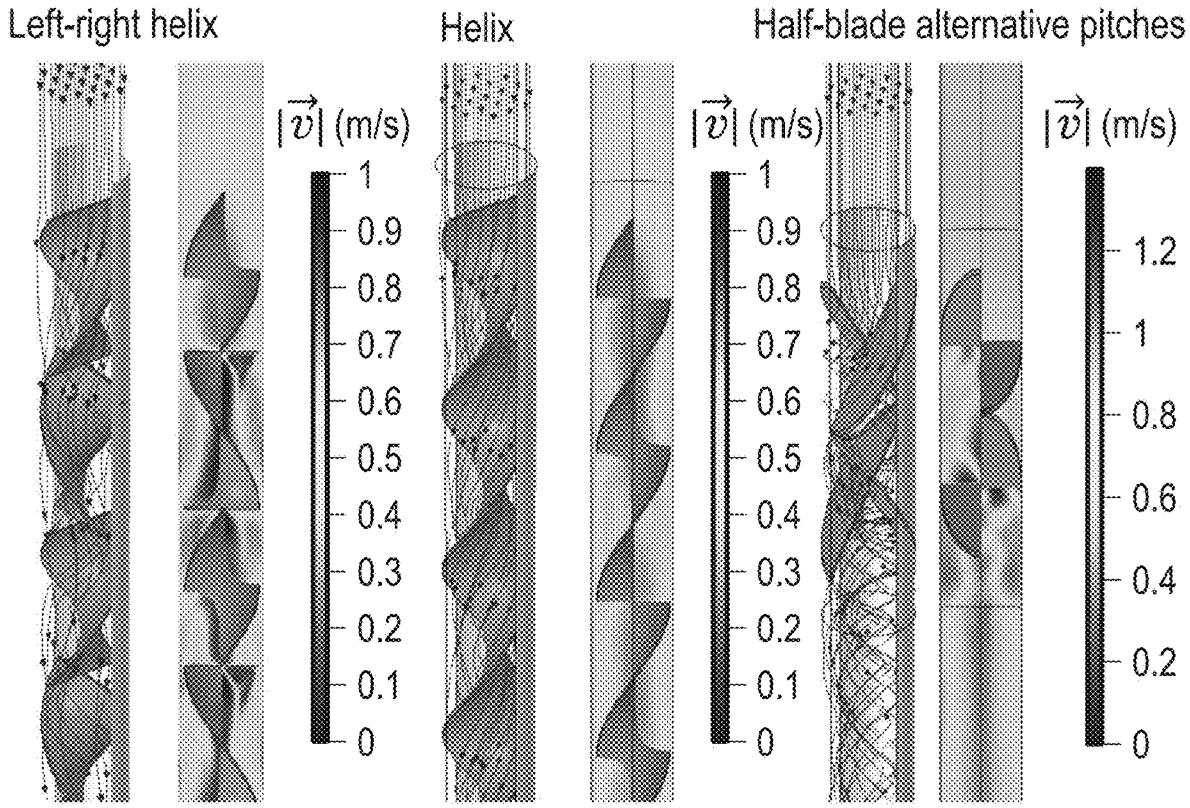
FIG. 3 is graph of plots showing a simulated fluid flow pattern of a pipe in presence of three different configurations of static mixers.

Fluid dynamics for installed embodiments, and associated heat transfer properties, have been simulated. One such simulation is performed by a computer simulation program called “COMSOL” Multiphysics package. FIG. 3 shows flow patterns in an 8.5-inch diameter pipe in the presence of three different static mixers: a left-right helix alternating structure, a helix structure, and a half-blade alternative pitch structure. Other mixer structures, and their combinations, can also be used for the current applications. Water is the assumed working fluid in the simulations performed. Other fluids may also be simulated. The average fluid flow velocity was set to 0.5 m/sec, corresponding to roughly 20 L/sec of injection rate. The pipe flow is disturbed by the presence of static mixers, which induces vortices near the wall and brings the colder fluid at the center of pipe to the wall for more effective heat exchange. Simulations show that the static mixers enhance the heat exchange efficiency by 5 to 10 percent, depending on the details of the injection rate and working fluid. Only minor or modest pressure drops (1 to 2 bar/s per 1 km of conduit) are observed for a class of static mixers, which makes them applicable for the geothermal systems in which the injection pressure is an important consideration, especially for project economics.

Associated pressure losses across each device are dependent upon the configuration (design) of each device or devices and their distribution across the wellbore. Computational fluid dynamics simulations can provide good estimates of likely friction losses, but final device designs may be measured in the field. Any reduction in system efficiency due to these additional pressure losses (due to the presence of the device) will be more than offset by the increase in thermal transfer efficiency the device will afford the EGS or AGS system. In some applications, the addition of friction reducer to the working fluid will reduce the pressure losses.

A combination of static mixer design and friction reducer could provide more optimized and efficient heat exchange with minimal pressure losses.

As will be understood, the static nature of the mixer allows for more efficient heat transfer to the working fluid, while eliminating moving parts. The elimination of moving parts from downhole systems allows for greater run times and less breakdowns for the wellbore. All of the above leads to increased efficiency at the jobsite.

Figure 4:
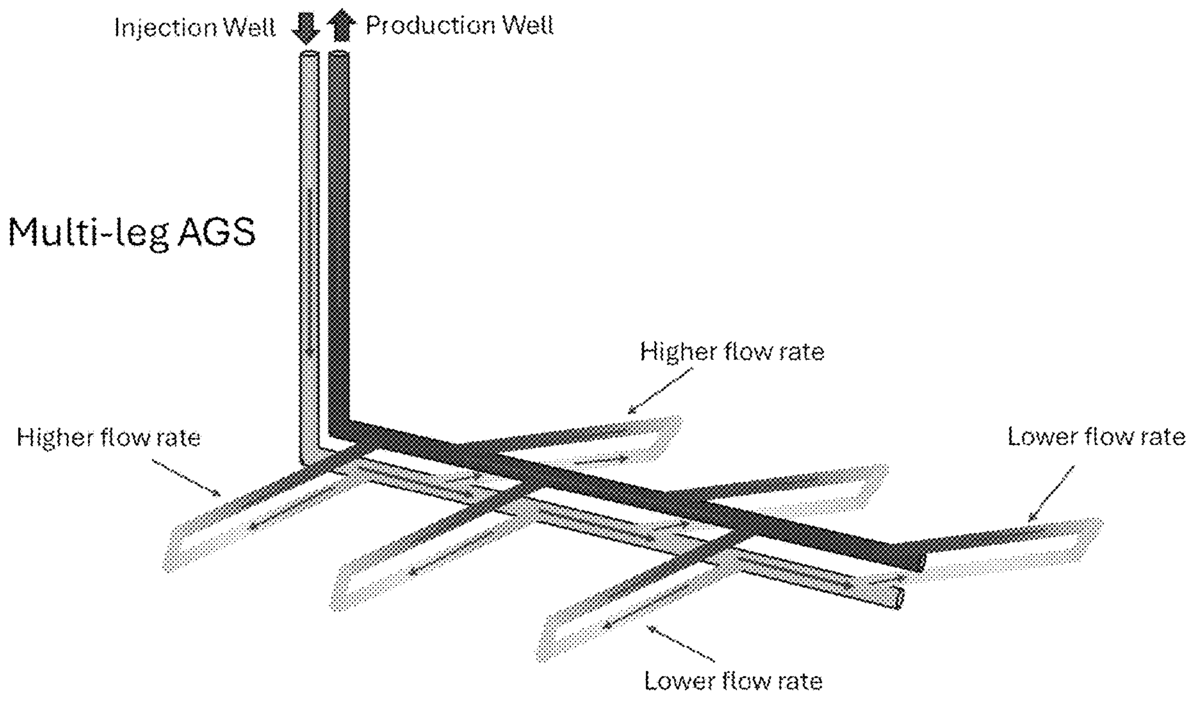
FIG. 4 is a schematic plot showing one example configuration of a multi-leg AGS system.

Capital costs for such installations, as described, are reasonable and may be retrofitted to systems that are currently in place. Example embodiments may use rugged materials such as carbon steel. If working fluids are more aggressive and corrosion is possible, other corrosion resistant materials may be used. Because the static mixer devices simultaneously enhance the heat exchange and induce a pressure drop, such devices can also be selectively installed at certain legs of a multi-leg or multilateral AGS system to regulate pressure drops to achieve more balanced flow rates at all legs or laterals. Since the static mixers will have an additional advantage of enhancing the heat exchange, they can be a better choice than conventional flow- rate regulation devices such as valves. A schematic plot of multiple legs AGS system is shown in FIG. 4. Typically, legs or laterals near the vertical injection and production wells have higher flow rate than those closer to the toe of the system. As a result, the working fluid produced from these legs with higher flow rate will be at a lower temperature, in comparison to legs with a lower flow rate. By installing the proposed static mixer devices in those legs or laterals ordinarily with a higher flow rate, one can both regulate the flow rate and enhance the heat exchange in those legs or laterals to achieve a more balanced flow rates at different legs and hence to yield a higher temperature working fluid.

Figure 5:
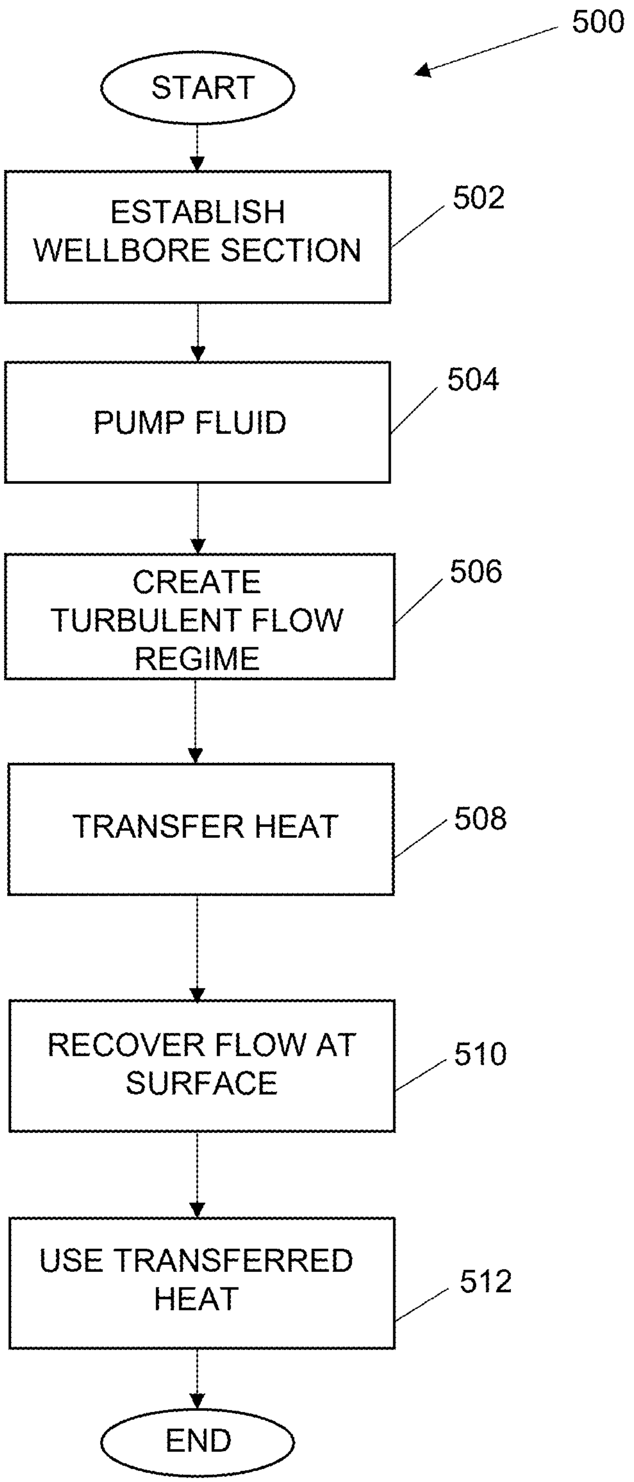
FIG. 5 is a flowchart of a method of using a static mixer in heat exchanging applications for geothermal applications.

Referring to FIG. 5, a method 500 for conducting a heat transfer to a fluid in a geothermal application is illustrated. The method may include, at 502, establishing a wellbore with at least one of a vertical and a horizontal section. The method may include, at 504, pumping a fluid into a geological stratum, the fluid at a first temperature and pressure. The method may include, at 506, using a static mixer, creating a turbulent flow in the fluid to increase a fluid velocity at an intersection of an interior of the wellbore and a casing of the wellbore. The method may further comprise, at 508, transferring heat to the turbulent flow created by the static mixer. The method may further comprise, at 510, recovering the turbulent flow at the surface. The method may further comprise, at 512, using the heat transferred into the turbulent flow in an industrial process. As will be understood, the industrial process may be any type of industrial process that requires a heat source. Example embodiments of industrial processes include, but are not limited to, electrical generation facilities. As will be understood, the method 500 may include EGS or AGS systems. The static mixer used at 506 may be placed in a vertical, horizontal or inclined position. At 506, the use of the static mixer removes any stagnant (or slow-moving) liquid films thus allowing for relatively colder fluids to interact with the side walls, creating a more efficient heat transfer.

Embodiments of the method and systems of the disclosure may be used with different types of fluid systems. In one example embodiment, water is used as the heat transfer medium. In other embodiments, a different fluid, such as carbon dioxide, may be used. Different phases of fluid may also be used, wherein in the case of carbon dioxide, temperatures and/or pressures may be experienced leading to supercritical state.

Other variations of fluids may also be used. Fluids may be organic or inorganic based. Still further variations are possible where different densities may be used. Additives may also be placed within the fluids to aid in heat transfer. In some embodiments, fluids with relatively low boiling points but high density may be used. Such fluids may include liquid metals, if precautions are undertaken to prevent spillage of such liquid metals to the environment. Such embodiments may also be advantageously used in relatively low heat environments, wherein a low flash point for vaporization would be beneficial used.

In some embodiments, the working fluid itself may be taken to the surface and run through a surface heat exchanger, thus allowing for a "closed loop" configuration. This configuration does not allow any cross-contamination between water systems undergoing heat transfer from down at the heat source and a working surface fluid. As will be understood, this surface heat exchanger may be an optional design. The use of the surface heat exchanger may decrease the overall efficiency of the system and may be incompatible with some marginal heat sources. For such marginal heat sources, the heat exchanged fluid may be directly used at the surface. In some embodiments, if the heat of sufficient quality, the working fluid may boil, thus generating a gas. This gas may be channeled through a steam turbine, for example, for powering a connected electrical grid system.

Control of the overall flow of the working fluid may be maintained or altered, as needed, by operators. Pumping units may transfer larger or smaller quantities of water at designated pressures through the downhole environment back to the surface.

Aspects of the disclosure provide an apparatus and methods that are easier to operate compared to conventional apparatus and methods.

Aspects of the disclosure provide apparatus and methods that do not have the drawbacks discussed above, namely high initial capital costs for system creation and high maintenance costs.

Aspects of the disclosure reduce economic costs associated with operations and apparatus described above with conventional tools.

Aspects of the disclosure create a system that is adaptable for different wellbore environments and that has a high variety of uses in various environments.

Aspects of the disclosure create a system that does not use or minimize the use of specialty designs therefore providing a more standardized system for geothermal extraction.

Aspects of the claims are described next. The aspects of the claims should not be considered limiting of the scope of the disclosure. In one example embodiment, a method for conducting a heat transfer to a fluid in a geothermal application by a system. The method may comprise establishing a wellbore with at least one of a vertical and a horizontal section. The method may further comprise pumping a fluid into a geological stratum, the fluid at a first temperature and first pressure. The method may further comprise creating a turbulent flow in the pumped fluid using a static mixer placed within the wellbore. The method may further comprise transferring heat from the geological stratum to the turbulent flow within the wellbore. The method may further comprise recovering the turbulent flow and returning the turbulent flow at a second temperature and a second pressure. The method may further comprise utilizing the transferred heat to the turbulent flow in an industrial process.

In another example embodiment, the method may be performed wherein the fluid is water.

In another example embodiment, the method may be performed wherein the fluid is in its supercritical phase.

In another example embodiment, the method may be performed wherein the industrial process is an electrical generating process.

In another example embodiment, the method may be performed wherein the system is an enhanced geothermal system.

In another example embodiment, the method may be performed wherein the system is an advanced geothermal system.

In another example embodiment, the method may be performed wherein the static mixer while creating a turbulent flow at least one of removes stagnant liquid films and removes slow-moving liquid films.

In another example embodiment, the method may be performed wherein the static mixer is placed in one of the vertical and horizontal sections of the wellbore.

In another example embodiment, the method may be performed wherein the wellbore is one of a cased and a non-cased wellbore.

In another example embodiment, the method may be performed wherein the static mixer is at least two static mixers.

In another example embodiment, the method may be performed wherein the fluid is one of an organic fluid and an inorganic fluid.

In another example embodiment, the method may be performed wherein the fluid has a flashing point lower than water.

In another example embodiment, a method for conducting a heat transfer to a fluid in a geothermal application by a system is disclosed. The method may comprise accessing a wellbore with at least one of a vertical and a horizontal section, the wellbore located within a geothermal area. The method may further comprise pumping a fluid into a geological stratum of the geothermal area, the fluid at a first temperature and first pressure. The method may further comprise passing the fluid through a static mixer placed within the wellbore. The method may further comprise transferring heat from the geological stratum to the fluid within the wellbore. The method may further comprise recovering the fluid at a second temperature and a second pressure, wherein the second temperature is higher than the first temperature. The method may further comprise utilizing the fluid at the second temperature and the second pressure in an industrial process.

In another example embodiment, the method may be performed wherein the recovered fluid is super critical carbon dioxide.

In another example embodiment, the method may be performed wherein the industrial process is an electrical generating process.

In another example embodiment, the method may be performed wherein a specific gravity of the fluid is higher than water.

In another example embodiment, a method for extracting heat from a geothermal source by a system is disclosed. The method may comprise one of creating and accessing a wellbore placed within the geothermal source. The method may further comprise transmitting a fluid into a geological stratum of the geothermal source, the fluid at a first temperature and first pressure. The method may further comprise passing the fluid through a static mixer placed within the wellbore. The method may further comprise transferring heat from the geothermal source to the fluid within the wellbore. The method may further comprise recovering the fluid at a second temperature and a second pressure, wherein the second temperature is higher than the first temperature.

In another example embodiment, the method may further comprise utilizing the fluid at the second temperature and the second pressure in an industrial process.

In another example embodiment, the method may be performed wherein at least one of a specific gravity, a density and a flash point of the fluid is greater than water.

In another example embodiment, the method may be performed wherein the recovered fluid is super critical carbon dioxide.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method for conducting a heat transfer to a working fluid in a geothermal application by a system, comprising:
- establishing a wellbore with at least one of a vertical and a horizontal section;
- pumping a working fluid into a geological stratum, the working fluid at a first temperature and a first pressure;
- creating a turbulent flow in the pumped working fluid using a static mixer placed within the wellbore;
- transferring heat from the geological stratum to the working fluid flow within the wellbore, wherein the turbulent flow created by the static mixer enhances the efficiency of the transferred heat from the stratum to the working fluid within the wellbore;
- recovering and returning the working fluid at a second temperature and a second pressure; and
- utilizing the transferred heat in the working fluid in an industrial process.

2. The method according to claim 1, wherein the working fluid is water.

3. The method according to claim 1, wherein the working fluid is in its supercritical phase.

4. The method according to claim 1, wherein the industrial process is an electrical generating process.

5. The method according to claim 1, wherein the system is an enhanced geothermal system, wherein the working fluid flows from the wellbore, through the geological stratum, and is recovered by a second wellbore with at least one of a vertical and a horizontal section.

6. The method according to claim 1, wherein the system is a closed-loop advanced geothermal system.

7. The method according to claim 1, wherein the static mixer while creating a turbulent flow removes at least one of stagnant liquid films and slow-moving liquid films.

8. The method according to claim 1, wherein the static mixer is placed in at least one of the vertical and horizontal sections of the wellbore.

9. The method according to claim 1, wherein the wellbore is one of a cased and a non-cased wellbore.

10. The method according to claim 1, wherein the static mixer is at least two static mixers.

11. The method according to claim 1, wherein the working fluid is one of an organic fluid and an inorganic fluid.

12. The method according to claim 1, wherein the working fluid has a flashing point lower than water.

13. A method for conducting a heat transfer to a working fluid in a geothermal application by a system, comprising:

accessing an injection wellbore with at least one of a vertical and a horizontal section, the wellbore located within a geological stratum;

pumping a working fluid into the geological stratum, the fluid at a first temperature and a first pressure;

passing the working fluid through a static mixer placed within the injection wellbore, wherein passing the working fluid induces a pressure drop in the working fluid while passing through the static mixer;

transferring heat from the geological stratum to the working fluid within the injection wellbore, wherein the pressure drop induced by the static mixer increases the efficiency of the transfer of heat from the geological stratum to the working fluid within the injection wellbore;

recovering the working fluid at a second temperature and a second pressure from a production wellbore, wherein the second temperature is higher than the first temperature; and utilizing the working fluid at the second temperature and the second pressure in an industrial process.

14. The method according to claim 13, wherein the recovered working fluid is super critical carbon dioxide.

15. The method according to claim 13, wherein the industrial process is an electrical generating process.

16. The method according to claim 13, wherein a specific gravity of the working fluid is higher than water.

17. A method for extracting heat from a geothermal source by a system, comprising:

accessing a wellbore placed within the geothermal source, wherein the wellbore comprises a multilateral wellbore comprising a plurality of lateral wellbores, wherein the wellbore and lateral wellbores are placed in a geological stratum of the geothermal source;

transmitting a working fluid into the wellbore and lateral wellbores, the working fluid at a first temperature and a first pressure;

passing the working fluid through at least one static mixer placed within the wellbore to create both a turbulent flow in the passing working fluid and a pressure drop in the passing working fluid;

transferring heat from the geothermal source to the working fluid within the wellbore wherein the turbulent flow and the pressure created by the at least one static mixer increases the thermal transfer efficiency of the transferred heat from the geothermal source to the working fluid within the wellbore;

recovering the working fluid at a second temperature and a second pressure at a wellbore surface, wherein the second temperature is higher than the first temperature, and wherein the at least one static mixer regulates the flow rate in the wellbore while recovering the working fluid; and utilizing the working fluid at the second temperature and the second pressure in an industrial process at the surface.

18. The method according to claim 17, wherein the system comprises a closed-loop advanced geothermal system.

19. The method according to claim 17, wherein the static mixer is placed within a lateral wellbore and at least another static mixer is placed in another lateral wellbore and wherein the static mixers regulate a flow of the working fluid within the lateral wellbores to achieve a balanced flow rate while recovering the working fluid to yield a higher second temperature.

20. The method according to claim 19, wherein the static mixer locations are selected in laterals with an ordinarily higher flow rate in order to achieve the balanced flow rate and the higher second temperature.

21. The method according to claim 1, wherein a friction reducer is added to the working fluid to reduce pressure losses in the system.

* * * * *